Aug. 19, 1947. C. A. THOMAS 2,425,901
MILKER NIPPLE
Filed Aug. 2, 1946 2 Sheets-Sheet 1
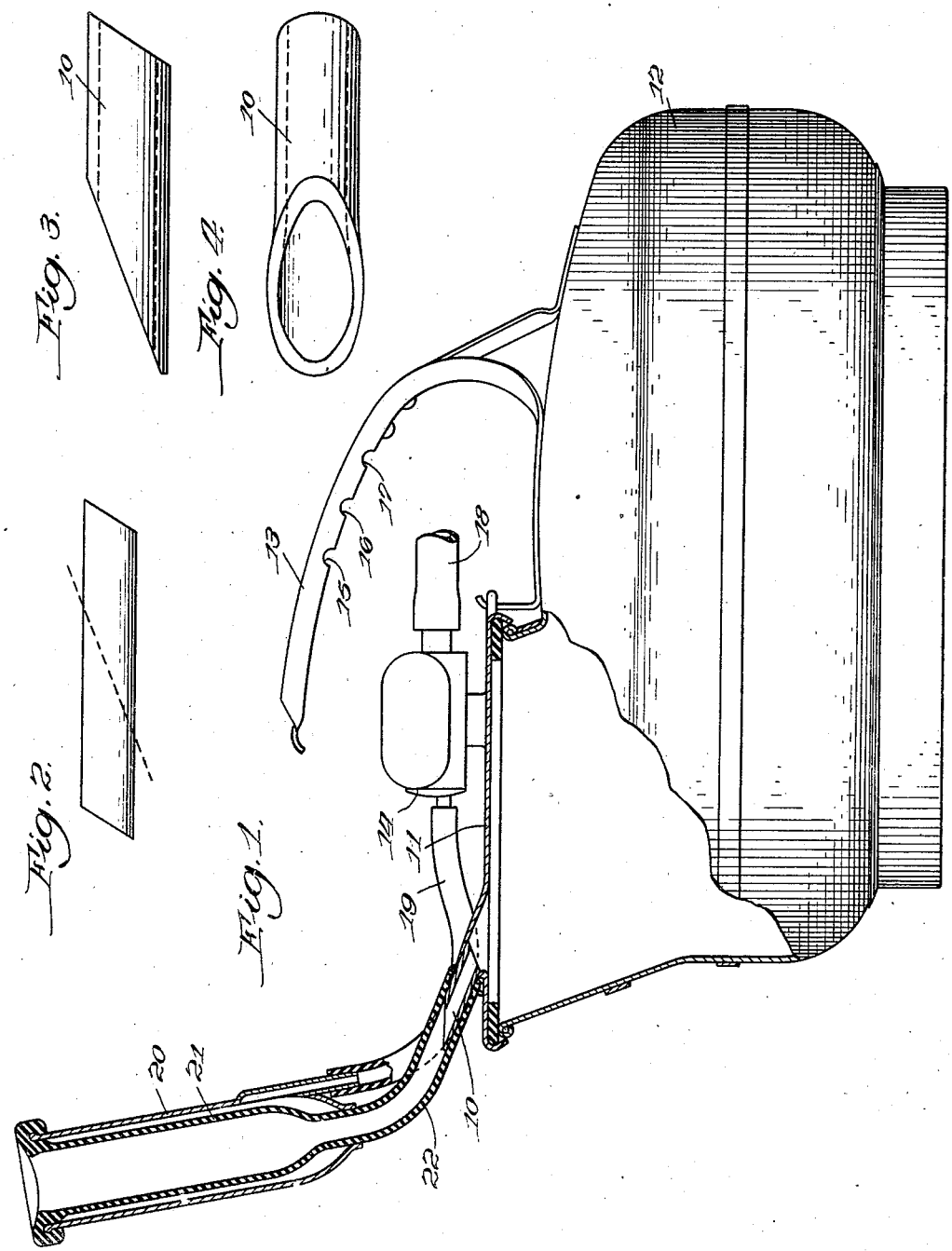
Inventor:
Chester A. Thomas.
By Chritton, Wiles, Davies & Hirschl.
Attys.

Aug. 19, 1947.  C. A. THOMAS  2,425,901
MILKER NIPPLE
Filed Aug. 2, 1946  2 Sheets-Sheet 2

Inventor:
Chester A. Thomas.
By Chritton, Wiles, Davies & Hirschl.
Attys.

Patented Aug. 19, 1947

2,425,901

UNITED STATES PATENT OFFICE 2,425,901

MILKER NIPPLE

Chester A. Thomas, Crystal Lake, Ill., assignor to Babson Bros. Co., a corporation of Illinois Application August 2, 1946, Serial No. 688,053
In Canada May 2, 1946

5 Claims. (Cl. 31—58)

This invention relates to a milker nipple adapted to provide an automatic shut-off connection between a milker and a flexible tube adapted to deliver milk thereto from a teat-cup.

Figure 5:
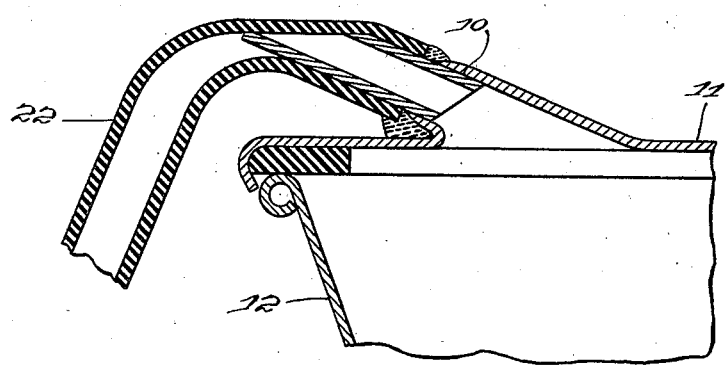
Figure 6:
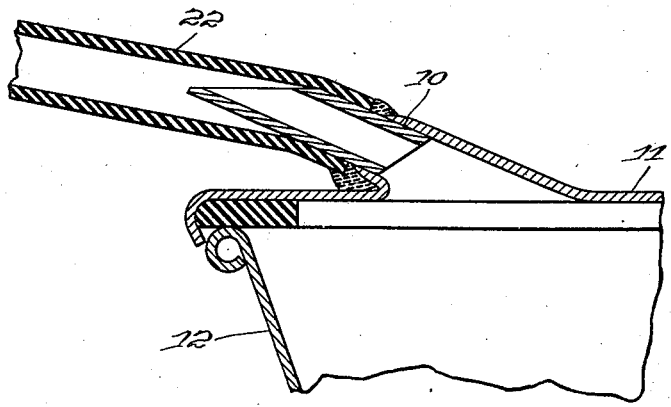

One feature of this invention is that it provides a new and improved connecting nipple; another feature of this invention is that partially choked milk delivery tubes are substantially eliminated; a further feature of this invention is that the preceding object is achieved without leakage around the nipple when the milk delivery tube is in a position where full cut-off is desired; another feature of this invention is that it may be easily and simply manufactured; and other features and advantages of this invention will be apparent from the following specification and the drawings, in which:

Figure 1 is a side view, partially in vertical section, of a milker embodying my invention; Figure 2 is an early step in the process of manufacturing nipples embodying my invention; Figure 3 is a side elevation view of the finished nipple; Figure 4 shows a top plan view of the finished nipple; Figure 5 is a partial sectional view showing the milk delivery tube in fully cut off position; and Figure 6 is a view of the same structure shown in Figure 5, but showing the milk delivery tube just as it opens.

The present application is a continuation-in-part of my application Serial No. 648,099, filed February 16, 1946, in turn a continuation of and substitute for my application Serial No. 404,248, filed July 26, 1941.

The use on the lid of milkers of connecting nipples which automatically cut off the connection when the teat-cup and its connecting tube drop has long been commercial practice, but such connecting nipples have presented disadvantages. Those which were made with a straight cut or flat face, as it may be termed, leaked around the edges of the face when the tube was in cut off position; and other nipples which have for years been made and used by the company by whom I am employed, and which obviated leakage by turning the end of the face up in a substantial hook or lip, were objectionable in that they resulted in partially choked milk delivery tubes at times when such tubes should have been fully opened. I have now devised, and am here disclosing, a connecting nipple which provides complete shut-off when this is desired, with no leakage around its edges, yet which opens the tube to fully desired width under conditions where previous nipples have partially choked the tube.

Referring now more particularly to Figure 1, I have shown a connector nipple 10 on the lid 11 of a suspended milker. The milker comprises as its principal parts a bucket or container 12, an upwardly and forwardly extending handle 13, the previously mentioned lid, and a pulsator 14. The milker is of the suspended type, more particularly described and claimed in McCornack Patents 1,859,213, dated May 17, 1932, and 2,050,356, dated August 11, 1936, and connecting nipples embodying my invention have proved particularly desirable in connection with such a milker.

As is well known, this type of milker is adapted to be hung beneath the belly of the cow by a surcingle extending over the cow's back, a rod or similar element supported beneath the cow's belly by the surcingle in turn supporting the milker by receiving in one of the notches 15, 16 or 17 in the handle 13. A long flexible tube 18 leads from the pulsator 14 to a source of vacuum, generally a metal pipe extending along the barn wall and continuously evacuated, during milking, by a vacuum pump. The vacuum thus produced is drawn continuously on the interior of the container or bucket 12, and alternately through the tube 19 by reason of the operation of the pulsator 14. A teat-cup shell of metal or the like, here identified as 20, has an inflation 21 therein of rubber or similar flexible material, the inflation in this case having integral with it a milk delivery tube here separately identified as 22, this tube being slipped over the nipple 10.

In the operation of the milker a vacuum is continuously drawn within the inflation 21 through the tube 22, and any milk drawn from the teat is delivered through this tube to the milker bucket; while the space between the inflation 21 and the shell 20 is alternately evacuated and opened to atmospheric air so that the inflation achieves the desired periodic squeezing of the teat. While only one nipple, teat-cup and inflation are shown in order to provide the clarity of illustration provided by a sectional view, it will be understood that the milker lid is provided with four such assemblies. When putting the teat-cups on and off one at a time, when a teat-cup drops off a teat, or in the abnormal cases of an udder with only three teats, it is necessary that the tube 22 be shut off when the cup is hanging down, since otherwise the vacuum in the bucket would be lost. It is for this purpose that the connecting nipple is provided with an automatic shut-off action, achieved by cutting its face at quite an acute angle to the axis of the tube from which the nipple is formed, and by welding the nipple in the milker lid at a corresponding angle, so that the face is substantially horizontal. Under these conditions, when the teat-cup drops down the tube 22 assumes the position shown in Figure 5, this connection being completely closed off.

In the manufacture of my improved nipple a tube of the desired rigid material, as stainless steel having an outer diameter of 7/16 inch, is first cut in sections about 2½ inches long, as shown by the full line representation in Figure 2, the tube then being cut straight across at a sharp angle, as illustrated by the dotted line in Figure 2. The angle of this cut must be other than a right angle and, if the nipple is properly to achieve its results, must be considerably less than 45° to the longitudinal axis of the tube, preferably being approximately 22.5°. If the cutting operation has left any ragged edges these may be next ground smooth, and then the nipple is placed in an automatic press, as a punch press, or otherwise subjected to a carefully regulated amount of pressure applied through a predetermined distance, directly down upon the face, to expand the transverse width of the face about twenty per cent without appreciably affecting the thickness of the walls of the tube at that end. The tube section may be supported, during this "bumping" operation, in a die having a cavity with the desired final exterior conformation of the nipple, the outer wall surface of the tube at said end preferably flaring only outwardly along its shortest transverse dimension. As can be best seen in Figure 4, the face is substantially elliptical as a result of its formation by the cut at a sharp angle to the axis of the tube, and its transverse exterior width, or maximum distance from edge to edge on the minor axis, is expanded about twenty per cent more than the exterior diameter of the undistorted cylindrical portion of the nipple, but the longitudinal axis of the finished nipple is still straight throughout its length.

In a preferred embodiment of my invention the tube having 7/16 inch outer diameter is spread to a diameter of about 17/32 inch across the face. Every effort is made to keep this expansion symmetrical, and a press carefully set to travel an appropriate distance will give equal expansion of the face of a plurality of nipples as they are being manufactured.

After the expanding operation just described the face of the nipple is preferably ground, as on a surface grinder, to a plane as illustrated in Figure 3. It will be understood, however, that some slight deviation from an absolute plane, as by having the face slightly "hollow" or lower at the center than the ends, is permissible and still results in a satisfactory nipple. The end or tip of the nipple is preferably rounded somewhat as by light grinding to remove the sharp edge which might otherwise cut the rubber tube.

As may be seen in Figure 5, the nipple is attached to a socket in the lid 11 by welding or other appropriate means, so that the axis of the nipple lies at approximately an angle of 22.5° to the plane of the lid. When the teat-cup drops down into fully hanging position the tube 22 has a tendency to flatten down where it lies along the face of the connecting nipple, and in so doing to widen out; but the expanded width of the face is sufficient that the tube never gets out of tight grip with it, and a good shut-off is provided. On the other hand, when the cup is only partially lifted, as where it is in place upon a rather low teat, the tube 22 is fairly well opened, as shown in Figure 6, under conditions where an upturned end on the nipple would have substantially completely closed it off. In order to determine the difference between the action of this and former connecting nipples, and to demonstrate the advantages of this nipple, similar arrangements were provided except for the two nipples, and the nipples tilted to determine when the milk delivery tube started to open and when it was fully opened. With my new nipple the connection started to open, with the cup hanging free, when the nipple face was slanting down at an angle of about 20–25° below the horizontal (i. e., when the nipple axis was about horizontal), and the connection was fully opened when the milker had been tilted until the nipple face was slanting down at an angle of about 45° below the horizontal (i. e., when the nipple axis was slanting down about 25° below the horizontal).

In the case of the formerly used nipple with an upturned end, however, a similar test showed that the connection did not start to open until the nipple axis was slanting down at an angle of about 40° below the horizontal and that it was not fully opened until an axis angle of 65° below the horizontal was reached. My improved connector nipple, therefore, gives a much greater operating latitude for unusual conditions and provides sufficient flow space under circumstances where the previous nipple would have completely choked off the milk delivery tube.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A milking bucket structure having integral therewith a nipple to provide a flow controlling connection between the the bucket and a flexible tube, comprising a rigid tubular member having its longitudinal axis in a straight line throughout its extent, said member having a cylindrical portion having the end face at one end thereof in a plane at an angle other than a right angle to the longitudinal axis and the outer edges of said end being so constructed and arranged that the maximum distance from edge to edge on the minor axis is greater than the exterior diameter of the cylindrical portion of the nipple, the walls of the tube at said end being of a thickness not appreciably different than the thickness of the walls throughout the remainder of the tube.

2. A milking bucket structure having integral therewith a nipple to provide a flow controlling connection between the bucket and a flexible tube, comprising a rigid tubular member having its longitudinal axis in a straight line throughout its extent, said member having a cylindrical portion having the end face at one end thereof in a plane at an angle other than a right angle to the longitudinal axis and the outer edges of said end being so constructed and arranged that the maximum distance from edge to edge on the minor axis is greater than the exterior diameter of the cylindrical portion of the nipple, the walls of the tube at said end being of a thickness not appreciably different than the thickness of the walls throughout the remainder of the tube and the outer wall surface of the tube along its shortest transverse dimension flaring only outwardly at said end.

3. A milking bucket structure having integral therewith a nipple to provide a flow controlling connection between the bucket and a flexible tube, comprising a rigid tubular member having its longitudinal axis in a straight line throughout its extent, said member having a cylindrical portion having the end face at one end thereof in a plane at an angle of less than forty-five degrees to the longitudinal axis and the outer edges of said end being so constructed and arranged that the maximum distance from edge to edge on the minor axis is greater than the exterior diameter of the cylindrical portion of the nipple but less than the maximum distance from edge to edge on the major axis of said end, the walls of the tube at said end being of a thickness not appreciably different than the thickness of the walls throughout the remainder of the tube.

4. A milking bucket structure having integral therewith a nipple to provide a flow controlling connection between the bucket and a flexible tube, comprising a rigid tubular member having its longitudinal axis in a straight line throughout its extent, said member having a cylindrical portion having the end face at one end thereof in a plane at an angle of less than forty-five degrees to the longitudinal axis and the outer edges of said end being so constructed and arranged that the maximum distance from edge to edge on the minor axis is approximately twenty percent greater than the exterior of the cylindrical portion of the nipple but less than the maximum distance from edge to edge on the major axis of said end, the walls of the tube at said end being of a thickness not appreciably different than the thickness of the walls throughout the remainder of the tube.

5. A milking bucket structure having integral therewith a nipple to provide a flow controlling connection between the bucket and a flexible tube, comprising a rigid tubular member having its longitudinal axis in a straight line throughout its extent, said member having a cylindrical portion having the end face at one end thereof in a plane at an angle of approximately twenty-two and a half degrees to the longitudinal axis and the outer edges of said end being so constructed and arranged that the maximum distance from edge to edge on the minor axis is approximately twenty percent greater than the exterior of the cylindrical portion of the nipple but less than the maximum distance from edge to edge on the major axis of said end, the walls of the tube at said end being of a thickness not appreciably different than the thickness of the walls throughout the remainder of the tube.

CHESTER A. THOMAS.